United States Patent [19]

Staruch et al.

[11] 4,068,293
[45] Jan. 10, 1978

[54] SCR D.C. INTERRUPTER

[75] Inventors: Stanisław Staruch; Bogdan Fijałkowski, both of Krakow; Janusz Zawiliński, Wieliczka, all of Poland

[73] Assignee: Politechnika Krakowska, Warsaw, Poland

[21] Appl. No.: 698,203

[22] Filed: June 21, 1976

[30] Foreign Application Priority Data

June 24, 1975 Poland .................. 181561

[51] Int. Cl.² .......................................... H02M 3/315
[52] U.S. Cl. ...................................... 363/27; 318/139; 363/135
[58] Field of Search .................. 321/43, 44; 318/139; 363/135, 136, 137, 27

[56] References Cited

U.S. PATENT DOCUMENTS

| | | | |
|---|---|---|---|
| 3,648,151 | 3/1972 | Gurwicz | 321/43 |
| 3,683,258 | 8/1972 | Harbonn | 318/139 X |
| 3,735,220 | 5/1973 | Renner et al. | 318/139 |
| 3,815,001 | 6/1974 | Jamieson | 318/139 |
| 3,837,419 | 9/1974 | Nakamura | 318/139 X |
| 3,855,520 | 12/1974 | Stich | 318/139 X |
| 3,872,362 | 3/1975 | Lecoeuche et al. | 318/139 |

Primary Examiner—William M. Shoop
Attorney, Agent, or Firm—Haseltine, Lake & Waters

[57] ABSTRACT

A semi-conductor controlled rectifier (SCR) d.c. interrupter in which any (optional) number $m$ of identical, self-contained and parallel connected phases each form an identical series connection of a semi-conductor controlled retifier $(Th_1) \ldots (TH_m)$ and a diodes $(D_1 \ldots D_m)$. An $m$ number of identical, self-contained resonant arms are arranged in star or Y-connection, with any of the arms having an identical series connection of a capacitor $(C_1) \ldots (C_m)$ and a reactor $(L_1) \ldots (L_m)$ respectively. The star vertices are connected between the cathodes of the semi-conductor controlled rectifiers $(Th_1) \ldots (Th_m)$ and the anodes of the diodes $(D_1) \ldots (D_m)$. The star neutral is associated with the d.c. power source (BA) positive or negative pole.

8 Claims, 1 Drawing Figure

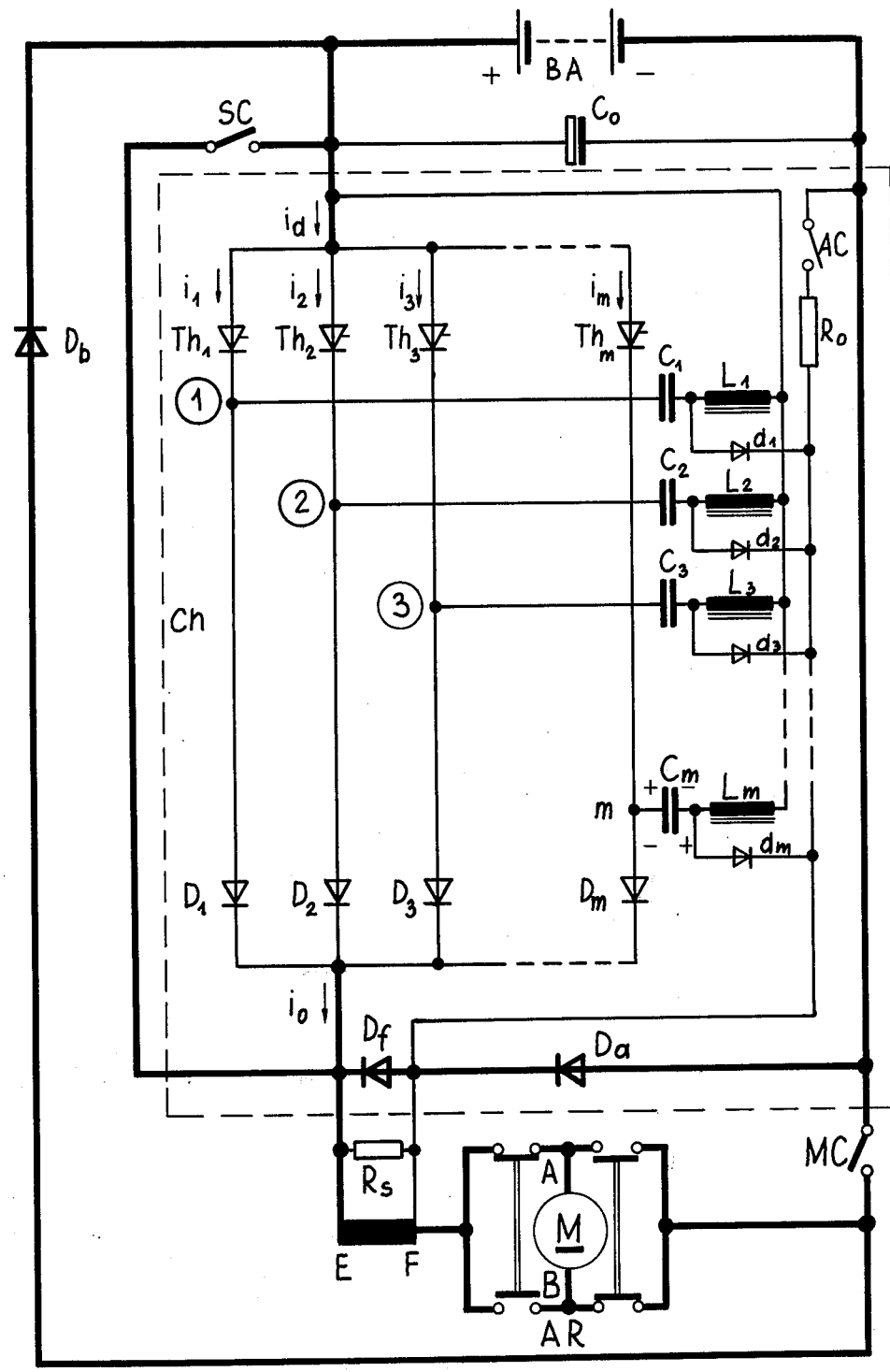

4,068,293

SCR D.C. INTERRUPTER

BACKGROUND OF THE INVENTION

The present invention relates to a multiphase SCR (semi-conductor controlled rectifier) d.c. interrupter, used for regulation of input or output power of electric loads, especially electric motors being use from direct current sources.

Existing SCR direct current interruptors require use of sophisticated control circuits and additional commutating (switching) semi-conductor controlled rectifiers, which increase interrupter weight and cost.

D.C. interrupters without the commutating SCRs are already known in the art. These are the single-phase interrupters, operating as pulse repetition frequency modulators with one SCR and a resonant parallel arm, the latter containing a reactor (inductance) and a capacitor (capacitance) or a current transformer performing as autotransformer and capacitor.

The semi-conductor controlled rectifier d.c. interrupter according to this invention is distinguished by the fact that it comprises any number of identical, parallel and self-contained phases, each of them being a series connection of SCRs and diodes, where the resonant arms are connected in star Y-connection and have series capacitors and reactors so that the star vertices (leads) are associated with the SCR cathodes and the diode anodes whereas the star neutral is connected with positive or negative pole of the d.c. power source. The diodes whose cathodes are connected in star Y-connection, have their anodes (star vertices) connected between the capacitors and reactors, while the star neutral (i.e. the diode cathodes) is associated — via the resistor and contactor — with the d.c. power source negative pole as well as with the cathode of one diode and the anode of the other diode. These diodes are connected in series. One of the series connected diodes has its anode associated with the d.c. power source negative pole. Its cathode and the other diode anode are connected between the armature and the excitation windings; the other diode cathode is connected between the excitation winding and the cathodes of the diodes which are connected in series with the semi-conductor controlled rectifiers. Between the d.c. motor and the d.c. power source negative pole, the latter being connected with anode of one of the diodes connected in series, the main contactor is introduced; between the d.c. power source positive pole and the d.c. motor, the diode is connected so that its anode is introduced between the d.c. motor and the main contactor, its cathode being associated with the d.c. power source positive pole. The excitation winding is shunted with the resistor, and the SCRs are triggered (fired) in predetermined sequence with phase displacement $2\pi/m$.

With the SCR interrupter in accordance with the present invention, the d.c. source full voltage will be available at its output (reduced only by voltage drop across the SCR and the diode); moreover, it features high efficiency and lower harmonic content in the output current.

BRIEF DESCRIPTION OF THE DRAWING

An embodiment of the present invention can be seen from the drawing attached, where the interrupter circuit diagram is shown.

DESCRIPTION OF THE PREFERRED EMBODIMENTS

The interrupter connected between the d.c. power source BA and the d.c. motor M comprises any optional number $m$ of identical and self-contained parallel phases where each of them constitutes an identical series connection of the semi-conductor controlled rectifiers $Th_1$ through $Th_m$ and the diodes $D_1$ through $D_m$. The resonant arms are arranged in star Y-connection have series connected capacitors $c_1$ through $c_m$ and reactors $L_1$ through $L_m$, and the star vertices are associated with respective cathodes of the semi-conductor controlled rectifiers $Th_1$ through $Th_m$ and with respective anodes of the diodes $D_1$ through $D_m$, whereas via the star neutral they are connected to the d.c. power source BA positive or negative pole. The interrupter comprises the diodes $d_1$ through $d_m$ whose cathodes are arranged in star Y-connection and whose star vertices (anodes) are connected between the capacitors $c_1$ through $c_m$ and the reactors $L_1$ through $L_m$. Accordingly, the star neutral (cathodes) are connected via the resistor $R_o$ and the contactor AC to the d.c. power source BA negative pole as well as to the diode Da cathode and the diode $D_f$ anode. The interrupter comprises also the series connected diodes $D_a$ through $D_f$. The diode $D_a$ anode is connected to the d.c. power source BA negative pole, whereas the diode $D_a$ cathode and the diode $D_f$ anode are introduced between the armature winding AB and the excitation winding EF. The diode $D_f$ cathode is connected between the excitation winding EF and cathodes of the diodes $D_1$ through $D_m$. Between the diode $D_f$ anode and the d.c. power source BA additional pole, the contactor SC is introduced to perform the interrupter making (closing) functions. The main contactor MC is connected between the d.c. motor M and the d.c. power source BA negative pole. The latter is associated with the diode $D_a$ anode. Between the d.c. motor M and the d.c. power source BA the diode $D_b$ is connected, its anode being introduced between the d.c. motor M and the main contactor MC while the $D_b$ diode cathode is connected to the d.c. power source BA positive pole. The excitation winding EF is shunted by the resistor $R_s$. The d.c. power source BA consists of the secondary battery and the filtering capacitor $C_o$.

The SCR interrupter in accordance with the present invention will operate according to the following sequence. During the d.c. motor M start-up, the semi-conductor controlled rectifiers $Th_1$ through $Th_m$ become fired by feeding of pulses to their control electrodes (gates). Quickly building-up current is initiated in the motor M loop and simultaneously the polarity as shown in the circuit diagram becomes established at the commutating capacitors $C_1$ through $C_m$ and begins the process of overcharging them. The oscillating overcharge current should exceed the current flowing via the SCRs $Th_1$ through $Th_m$ till the cut-off moment, and this condition will be attained by proper choice of the $C_1$ through $C_m$ capacitances. During the capacitors overcharge, the polarity at the semi-conductor controlled rectifiers $Th_1$ through $Th_m$ becomes reversed thus causing them to change to the non-conductive condition. The interrupter output current $i_o$ ceases but the motor M loop current is continued due to the electromagnetic energy stored in the motor windings, and flows across the $D_o$ diode. In this manner, during the non-conduction period of the SCRs $Th_1$ through $Th_m$, the motor M current is gradually decreased. At the same time, overcharging of the $C_1$ through $C_m$ capacitors takes place so that they acquire the polarity as indicated under the capacitor $C_m$ in the diagram. Then, the semi-conductor controlled rectifiers $Th_1$ through $Th_m$ become fired and the whole process will be repeated. Firing (enabling) and blocking (disabling) of the SCRs will take place at the current maximum and minimum instantaneous values as preset with the interrupter controller. In the motor steady state condition, the commutation process is stable and the function of current vs time consists of the current build-up and falling sections. In the SCRs' $Th_1$ through $Th_m$ non-conductive condition, the commutating capacitors $C_1$ through $C_m$ will be aperiodically charged in the predetermined sequence, with the $2\pi/m$ phase displacement, up to the voltage level of the d.c. power source BA i.e. the secondary battery, whereas at the moment of the SCRs' firing these capacitors with oscillatingly discharge, with the $2\pi/m$ phase displacement, via the semi-conductor controlled rectifiers $Th_1$ to $Th_m$ and the ferrite core commutating reactors (discharge coils) $L_1$ through $L_m$. At the moment when the SCRs $Th_1$ through $Th_m$ are switched on, potentials from the capacitors as previously charged to the almost same level as that of the d.c. power source BA, become drained — with the $2\pi/m$ phase displacement to the reactors to saturate their ferrite cores in the direction which will be conventionally understood as the negative one, so that the magnetic fluxes change from the initial value $\phi_o$ to the ultimate level $\phi_s$. Till the moment when the negative saturation has been reached, the said potentials can be assumed to be of constant value. With the saturated condition reached, there begins the periods of the capacitors' resonant discharge. Their potentials become reversed (at the $2\pi/m$ phase displacement), and the reactors lose the negative saturation condition after some time become saturated in positive direction. The oscillating process, being interrupted as the reactors become unsaturated, can be continued for some time. The capacitors' currents flow in the semi-conductor controlled rectifiers $Th_1$ through $Th_m$, the phase displacement being $2\pi/m$, in the opposite direction to that of the motor M current, and, after exceeding 1/m of this current mean value, they become inverse currents causing the SCRs $Th_1$ through $Th_2$, cut off.

This process will be periodically repeated in the rhythm of impulses gating (firing) the SCRs $Th_1$ through $Th_m$, at phase displacement $2\pi/m$, and therefore the motor M receives the train of pulses whose repetition rate is $mf$, i.e., the product of the interrupter phase number and the frequency of gating impulses which fire the semi-conductor controlled rectifiers $Th_1$ through $Th_m$.

Length (duration) of these pulses will be determined by the d.c. power source voltage, the capacitors' capacitances, the reactors' number of turns and the ferrite core cross-sectional area. With the reactors of specific design and constant frequency of firing, the voltage mean value across the d.c. motor M terminals will be directly proportional to the SCRs' firing (gating) frequency.

In the electric braking condition, the main contactor MC breaks and the reverser AR changes over into the other position. When firing the semi-conductor controlled rectifiers $Th_1$ through $Th_m$, self-excitation of the d.c. motor M takes place in its short-circuit condition, and the current flows via the SCRs $Th_1 - th_m$, the diodes $D_1$ through $D_m$ and the diode $D_b$. With the value $i_{max}$, attained the semi-conductor controlled rectifiers $Th_1$ through $Th_2$ through $Th_2$ do not conduct, and the electric braking loop becomes broken. Current flow in the d.c. motor M loop, however, continues due to the electromagnetic energy which has been stored in the motor windings. This current flows across the diodes $D_a$ and $D_f$, the excitation winding EF and the armature winding AB, the diode $D_b$, and returns via the d.c. power source (secondary battery) BA so that the battery equalizing charge is possible. Then, the semi-conductor controlled rectifiers $Th_1$ through $Th_m$ and the diodes $D_1$ through $D_m$ begin to conduct again, and so the process is recycled. The diode $D_f$ will shunt the excitation winding and therefore, stablize the braking condition when the motor M rotation electromotive force exceeds the secondary battery potential. Due to this, there is a possibility for continued self-excitation of motor U via the secondary battery.

Any number $m$ of identical, self-contained and connected-in-parallel phases of same frequencies $f$ and the phase displacement $2\pi/m$, can feed one d.c. motor M. The load feeding output current $i_o$ from the interrupter is the sum of currents of individual phases being switched ON and OFF in predetermined sequence and the phase displacement $2\pi/m$. The output current $i_o$ ripple amplitude is lower and the ripple frequency is m-times higher than the relevant values of the interrupter current components. The input current $i_d$ vs time waveform is similar to that of rectangular pulses whose repetition rate is mf and the amplitude 1/m of the output current mean value. The input current $i_d$ contains the harmonics of $n = m, 2m, 3m \ldots$ only.

For other values of $n$, no harmonics are encountered with this interrupter. Thus, the higher the interrupter phase number, the lower becomes the harmonic content in the input current $i_d$, and consequently its rms value.

Due to the common commutating star, whose legs (phases) form the resonant arms which include the capacitors $C_1$ through $C_m$ and the ferrite core coils (reactors) $L_1$ through $L_m$, the interrupter features simple design, while preserving such qualities of systems with artificial commutation such as low energy stored in the commutation loop and favorable dynamic characteristics.

We claim:

1. A semi-conductor controlled rectifier d.c. interrupter comprising: a plurality of identical self-contained and parallel connected phases; each phase having a series connection of a semi-conductor controlled rectifier and a diode; Y-connected resonant arms including series-connected capacitors and reactors; a d.c. power source; the vertices of the Y-connection being connected to said rectifiers, and the anodes of said diodes, the neutral junction of the Y-connection being connected to one terminal of said power source, said phases operating as modulators of pulse repetition frequency with phase shift given by the ratio of $2\pi$ to the number of said parallel connected phases.

2. The interrupter as defined in claim 1, including first auxiliary diodes with cathodes connected together, the anodes of said first auxiliary diode being connected to respective junctions of said capacitors and reactors; a series-connected resistor means and switching means between the common connection of the cathodes of said first auxiliary diodes, and the negative terminal of said power source; two second auxiliary diodes connected inseries, the series combination of said second auxiliary diodes being in parallel with said power source, the common connection of the cathodes of said first auxiliary diodes being connected to the junction of said two second auxiliary diodes.

3. The interrupter as defined in claim 1 including motor means with an armature winding and a field excitation winding; two auxiliary diodes connected in series, the series connection of said two diodes being in parallel with said power source; said two auxiliary diodes having the cathode of one connected to the anode of the other auxiliary diode, and to the junction of said field winding and said armature winding, the anode of said one auxiliary diode being connected to the negative terminal of said power source, the cathode of said other auxiliary diode being connected to the cathodes of said first-mentioned diodes.

4. The interrupter as defined in claim 1, including motor means and switching means connected between said motor means and the negative terminal of said power source.

5. The interrupter as defined in claim 4, including an auxiliary diode with anode connected to the junction of said switching means and said motor means, the cathode of said auxiliary diodes being connected to the positive terminal of said power source.

6. The interrupter as defined in claim 3, including resistor means connected in parallel with said field excitation winding of said motor means.

7. The interrupter as defined in claim 1, wherein said semi-conductor controlled rectifiers are gated in predetermined sequence, the phase displacement in the gating sequence of said rectifiers being $2\pi$ radiants divided by the number of said parallel-connected phases.

8. The interrupter as defined in claim 1 including first auxiliary diodes with cathodes connected together, the anodes of said first auxiliary diode being connected to respective junctions of said capacitors and reactors; a series-connected resistor means and switching means between the common connection of the cathodes of said first auxiliary diodes, and the negative terminal of said power source; two second auxiliary diodes connected in series, the series combination of said second auxiliary diodes being in parallel with said power source, the common connection of the cathodes of said first auxiliary diodes being connected to the junction of said two second auxiliary diodes; motor means with an armature winding and a field excitation winding; two auxiliary diodes connected in series, the series connection of said two diodes being in parallel with said power source; said two auxiliary diodes having the cathode of one connected to the anode of the other auxiliary diode, and to the junction of said field winding and said armature winding, the anode of said one auxiliary diode being connected to the negative terminal of said power source, the cathode of said other auxiliary diode being connected to the cathodes of said first-mentioned diodes.

* * * * *